(12) United States Patent
Park et al.

(10) Patent No.: US 12,439,047 B2
(45) Date of Patent: Oct. 7, 2025

(54) MULTILEVEL SELECTIVE RENDERING METHOD AND APPARATUS FOR INCREASING RENDERING PERFORMANCE

(71) Applicant: SiliconArts Technology US Inc., Waco, TX (US)

(72) Inventors: Woo Chan Park, Seoul (KR); Ji Young Kim, Seoul (KR); Yun Ho Han, Seoul (KR)

(73) Assignee: SiliconArts Technology US Inc.

( * ) Notice: Subject to any disclaimer, the term of this patent is extended or adjusted under 35 U.S.C. 154(b) by 243 days.

(21) Appl. No.: 18/235,633

(22) Filed: Aug. 18, 2023

(65) Prior Publication Data

US 2024/0064304 A1    Feb. 22, 2024

(30) Foreign Application Priority Data

Aug. 19, 2022    (KR) .......... 10-2022-0104115

(51) Int. Cl.
| | |
|---|---|
| *H04N 19/132* | (2014.01) |
| *G06T 7/11* | (2017.01) |
| *G06V 10/56* | (2022.01) |
| *G06V 10/74* | (2022.01) |

(52) U.S. Cl.
CPC .............. *H04N 19/132* (2014.11); *G06T 7/11* (2017.01); *G06V 10/56* (2022.01); *G06V 10/761* (2022.01)

(58) Field of Classification Search
CPC ........ H04N 19/132; G06T 7/11; G06V 10/56; G06V 10/761

USPC ..................................... 375/240.12
See application file for complete search history.

(56) References Cited

U.S. PATENT DOCUMENTS

2015/0379688 A1    12/2015    Cheng et al.

FOREIGN PATENT DOCUMENTS

KR    10-2015-0039493 A    4/2015

OTHER PUBLICATIONS

Korean Office Action for related KR Application No. 10-2022-0104115 mailed Jan. 17, 2023 from Korean Intellectual Property Office.

*Primary Examiner* — Nguyen T Truong
(74) *Attorney, Agent, or Firm* — BROADVIEW IP LAW, PC

(57) ABSTRACT

A multilevel selective rendering method for increasing rendering performance, includes: setting a multilevel threshold for a current tile in a rendering process for an image frame divided into a plurality of tiles; generating initial sampling blocks by performing initial sampling for the current tile; generating first level blocks by performing first level selective rendering according to a first level threshold of the multilevel threshold based on the initial sampling blocks; generating second level blocks by performing second level selective rendering according to a second level threshold of the multilevel threshold based on the first level blocks; and initiating the multilevel selective rendering for a next tile of the current tile when multilevel selective rendering for the current tile is completed through repetition of level-specific selective renderings.

16 Claims, 12 Drawing Sheets

MULTILEVEL SELECTIVE RENDERING METHOD AND APPARATUS FOR INCREASING RENDERING PERFORMANCE

CROSS-REFERENCE TO PRIOR APPLICATION

This application claims priority to Korean Patent Application No. 10-2022-0104115 (filed on Aug. 19, 2022), which is hereby incorporated by reference in its entirety.

ACKNOWLEDGEMENT

National Research Development Project Supporting the Present Invention

Project Serial No. 1711174142
Tax Project No.: 00156354
Ministry of Science and ICT
Project Management (Professional) Institute: Institute of Information & Communications Technology Planning & Evaluation
Research Project Name: Information & Communication Broadcasting Innovation Human Resource Training (R&D)
Research Task Name: Ultra-realistic XR Technology Research for Real-virtual Connection Metaverse
Contribution Ratio: 1/1
Project Performing Institute: Sejong University Industry Academy Cooperation Foundation
Research Period: 2022.07.01-2022.12.31

BACKGROUND

The present disclosure relates to a three-dimensional (3D) graphics processing technology, and more particularly, to a method and an apparatus of multilevel selective rendering for increasing rendering performance capable of significantly reducing the number of rendering pixels while maintaining a certain level of image quality.

A 3D graphic technology is a graphic technology that uses a three-dimensional representation of geometric data stored in computing, and is widely used today in various industries including the media industry and the game industry. In general, the 3D graphic technology requires a separate high-performance graphic processor due to a large amount of computation.

Recently, with the development of processors, research is being conducted on ray tracing technology that can create very realistic 3D graphics.

The ray tracing technology as a rendering scheme based on global illumination can create realistic 3D images because reflection, refraction, and shadow effects are naturally provided by considering an effect of light reflected or refracted from other objects on an image of a current object.

PRIOR ART REFERENCES

Patents

Korea laid-open patent No. 10-2015-0039493 (Apr. 10, 2015)

SUMMARY

In view of the above, the present disclosure provides a method and an apparatus of multilevel selective rendering for increasing rendering performance capable of significantly reducing the number of rendering pixels while maintaining a certain level of image quality.

According to embodiments of the present disclosure, a multilevel selective rendering method for increasing rendering performance includes: setting a multilevel threshold for a current tile in a rendering process for an image frame divided into a plurality of tiles; generating initial sampling blocks by performing initial sampling for the current tile; generating first level blocks by performing first level selective rendering according to a first level threshold of the multilevel threshold based on the initial sampling blocks; generating second level blocks by performing second level selective rendering according to a second level threshold of the multilevel threshold based on the first level blocks; and initiating the multilevel selective rendering for a next tile of the current tile when multilevel selective rendering for the current tile is completed through repetition of level-specific selective renderings.

The setting of the multilevel threshold may include setting the multilevel threshold including a plurality of level thresholds based on a color difference between blocks.

The multilevel threshold may be set so that a high level threshold is lower than a low level threshold.

The setting of the multilevel threshold may include decreasing each level threshold of the multilevel threshold for each tile as the tile is closer to a central region of the image frame, and increasing each level threshold for each tile as the tile is closer to an edge region of the image frame.

The generating of the initial sampling blocks may include preferentially performing sampling for corner blocks disposed at each corner of the current tile in the initial sampling process.

The generating of the initial sampling blocks may include performing the initial sampling process while moving at equal intervals in vertical and horizontal directions based on any one of the corner blocks.

The generating of the initial sampling blocks may include logically dividing the current tile into a normal region including blocks sampled at equal intervals among the initial sampling blocks and a border region including other blocks when the initial sampling process is completed.

The generating of the first level or second level blocks may include determining a rendering type for a current level block for the level-specific selective rendering based on a previous level block, selectively performing any one of interpolation and sampling according to the rendering type for the current level block, and storing, when the current level block is generated, the current level block in a tile buffer.

The generating of the first level or second level blocks may include determining the interpolation as the rendering type for the current level block when a color difference between adjacent blocks adjacent on both sides in a diagonal, vertical, or horizontal direction based on the current level block is smaller than a current level threshold, and determining the sampling as the rendering type if not.

The generating of the first level or second level blocks may include correcting the color difference by applying a weight according to an interval from the adjacent blocks when the current level block is present in a border region of the current tile.

The initiating of the multilevel selective rendering may include transporting a final result value stored in the tile buffer to a frame buffer when the multilevel selective rendering for all blocks in the current tile is completed.

The initiating of the multilevel selective rendering may include initiating the multilevel selective rendering for the current tile and at least one other file selected from the plurality of tiles in parallel.

According to embodiments, a multilevel selective rendering apparatus for increasing rendering performance includes: a tile generation unit dividing an image frame into a plurality of tiles in a rendering process for the image frame, and managing information on a current tile among the plurality of tiles; a rendering unit performing rendering for blocks of the current tile based on a rendering position; an interpolation unit performing interpolation for the blocks of the current tile based on an interpolation position; a level processing control unit managing multilevel selective rendering for the current tile; and a selective rendering control unit determining a rendering type according to a multilevel threshold based on a block position of a current level, and controlling an operation of the rendering unit or the interpolation unit according to the rendering type.

The level processing control unit may generate a block position for initial sampling of the current tile and transfer the block position to the rendering unit, and receive a result value according to the rendering, and store the result value in a tile buffer.

The level processing control unit may transfer a block position for level-specific selective rendering to the selective rendering control unit.

The selective rendering control unit may calculate a color difference between adjacent blocks based on the block position by referring the tile buffer, and compare the color difference and the multilevel threshold to determine the rendering type.

The selective rendering control unit may receive a result value according to the operation of the rendering unit or the interpolation unit, and store the result value in the tile buffer.

The disclosed technology may have the following effects. However, since it is not meant that a particular embodiment should include all of the following effects or merely include the following effects, the scope of the disclosed technology is not to be construed as being limited thereby.

Ray tracing can make it easier to create a realistic 3D image than a rasterization technique because the ray tracing traces a ray for each pixel. However, since the ray tracing shoots and traces a ray to every pixel, the amount of computation can be very high. As a method for overcoming this problem, selective rendering can first perform rendering at a low resolution and then effectively generate a high-resolution image according to the degree of color difference between pixels.

The method and the apparatus of multilevel selective rendering for increasing rendering performance according to the present disclosure relate to a method and an apparatus of multilevel selective rendering capable of significantly reducing the number of rendering pixels while maintaining a certain level of image quality.

The method and the apparatus of multilevel selective rendering for increasing rendering performance, unlike typical selective rendering, can effectively process a boundary region to increase parallelism, and perform selective rendering at multi-levels to reduce image quality degradation and simultaneously reduce the amount of computation.

DETAILED DESCRIPTION

Figure 1:
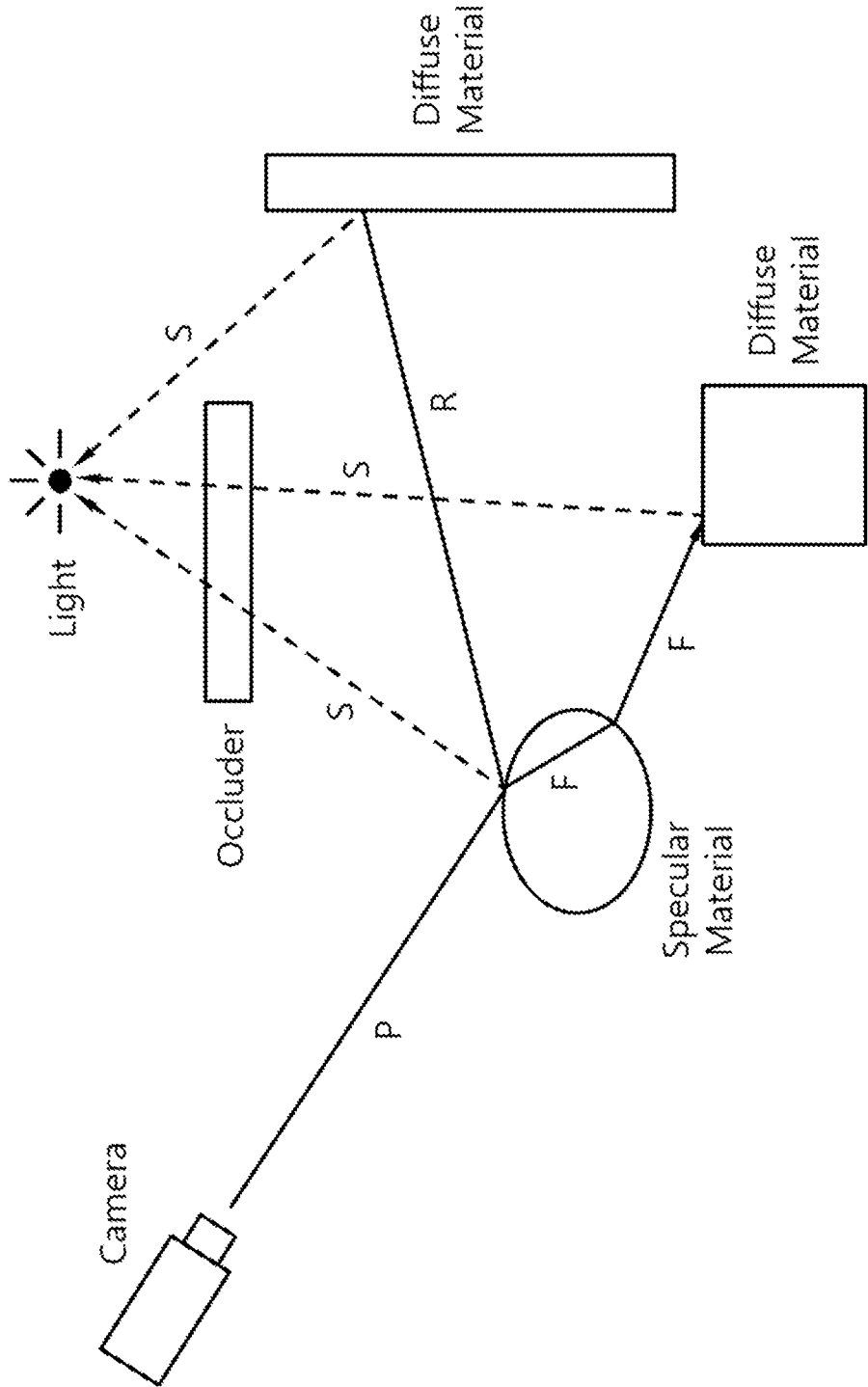
FIG. 1 is a diagram for describing an embodiment of a ray tracing process.

A description of the present disclosure is merely an embodiment for a structural or functional description and the scope of the present disclosure should not be construed as being limited by an embodiment described in a text. That is, since the embodiment can be variously changed and have various forms, the scope of the present disclosure should be understood to include equivalents capable of realizing the technical spirit. Further, it should be understood that since a specific embodiment should include all objects or effects or include only the effect, the scope of the present disclosure is limited by the object or effect.

Meanwhile, meanings of terms described in the present application should be understood as follows.

The terms "first," "second," and the like are used to differentiate a certain component from other components, but the scope of should not be construed to be limited by the terms. For example, a first component may be referred to as a second component, and similarly, the second component may be referred to as the first component.

It should be understood that, when it is described that a component is "connected to" another component, the component may be directly connected to another component or a third component may be present therebetween. In contrast, it should be understood that, when it is described that an element is "directly connected to" another element, it is understood that no element is present between the element and another element. Meanwhile, other expressions describing the relationship of the components, that is, expressions such as "between" and "directly between" or "adjacent to" and "directly adjacent to" should be similarly interpreted.

It is to be understood that the singular expression encompasses a plurality of expressions unless the context clearly dictates otherwise and it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

In each step, reference numerals (e.g., a, b, c, etc.) are used for convenience of description, the reference numerals are not used to describe the order of the steps and unless otherwise stated, it may occur differently from the order specified. That is, the respective steps may be performed similarly to the specified order, performed substantially simultaneously, and performed in an opposite order.

The present disclosure can be implemented as a computer-readable code on a computer-readable recording medium and the computer-readable recording medium includes all types of recording devices for storing data that can be read by a computer system. Examples of the computer readable recording medium may include a ROM, a RAM, a CD-ROM, a magnetic tape, a floppy disk, an optical data storage device, and the like. Further, the computer readable recording media may be stored and executed as codes which may be distributed in the computer system connected through a network and read by a computer in a distribution method.

If it is not contrarily defined, all terms used herein have the same meanings as those generally understood by those skilled in the art. Terms which are defined in a generally used dictionary should be interpreted to have the same meanings as the meanings in the context of the related art, and are not interpreted as ideal meanings or excessively formal meanings unless clearly defined in the present application.

FIG. 1 is a diagram for describing an embodiment of a ray tracing process.

Referring to FIG. 1, a ray tracing scheme performed by a ray tracing image quality control apparatus may correspond to a rendering scheme according to global illumination. This may mean that light reflected or refracted from another object also affects an image of a current object. As a result, since reflection, refraction, and shadow effects are naturally provided, realistic 3D images may be created.

The ray tracing image quality control apparatus may first generate a primary ray P from a camera position per pixel and perform a calculation to find an object that meets the ray. If an object which meets the ray has a property of reflection or refraction, the ray tracing image quality control apparatus may generate a reflection ray R for a reflection effect or a reflection ray F for a refraction ray at a position where the ray and the object meet, and also generate a shadow ray S in a light direction for a shadow effect.

In this case, if the shadow ray directed to the corresponding light position and a predetermined object meet, a shadow is generated, otherwise no shadow is generated. The reflection ray and the refraction ray are called secondary ray, and the ray tracing image quality control apparatus may perform a calculation to find an object that meets the ray for each ray. This process may be performed recursively by the ray tracing image quality control apparatus.

Figure 2:
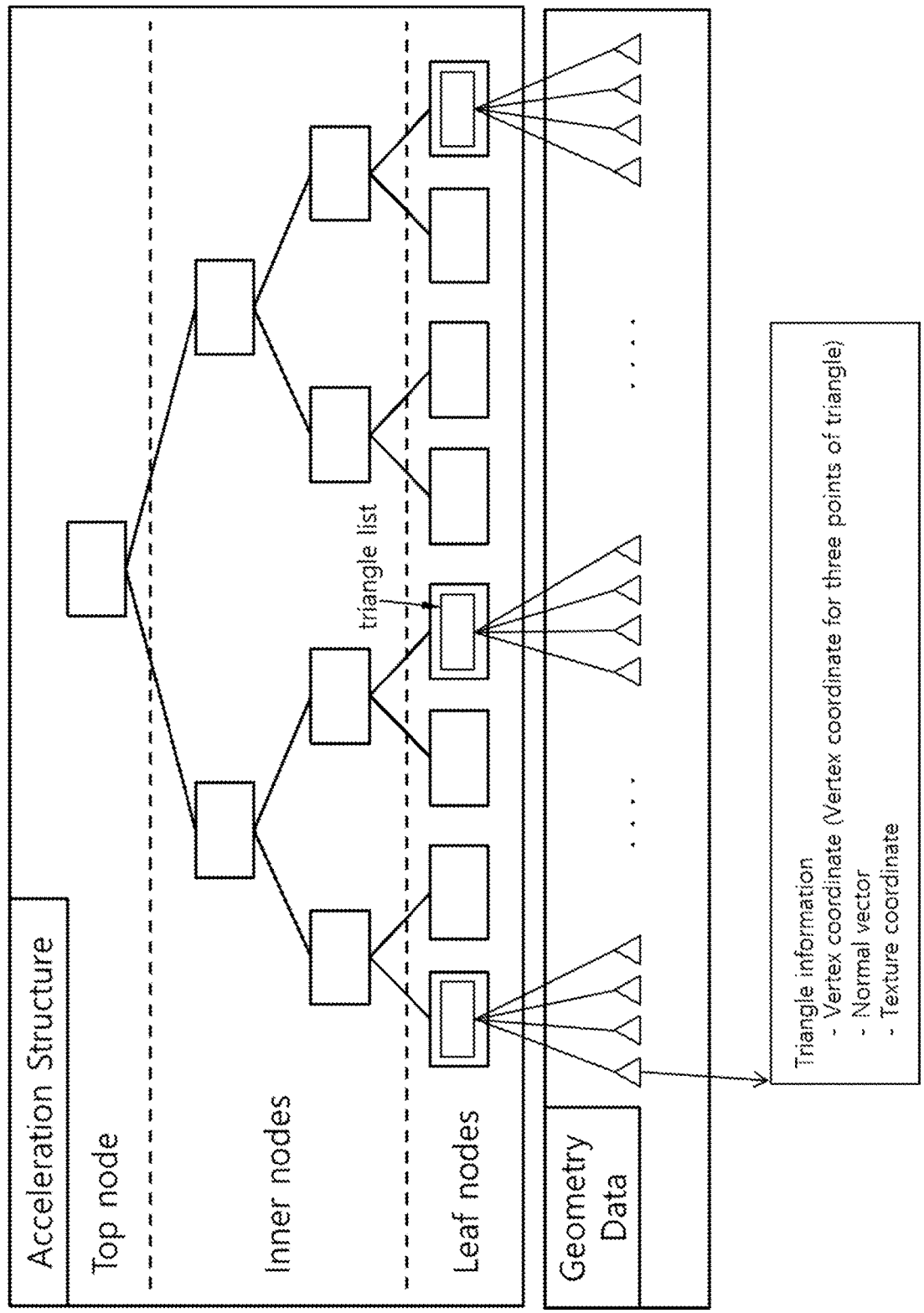
FIG. 2 is a diagram for describing an embodiment of a KD tree as an acceleration structure used in the ray tracing process.

FIG. 2 is a diagram for describing an embodiment of a KD tree as an acceleration structure used in the ray tracing process.

Referring to FIG. 2, in order to perform ray tracing, an acceleration structure (AS) such as a K-Dimensional (KD) tree or Bounding Volume Hierarchy (BVH) generated based on the entire geometry data (consisting of triangle coordinates) is requisitely required. Therefore, it is necessary to build the AS before performing the ray tracing. Since the acceleration structure building requires a large computation amount, the acceleration structure building may take a lot of time.

In FIG. 2, the overall configuration diagram of the KD-tree is described. The KD-tree may correspond to a binary tree having a hierarchical structure for the divided space. The KD-tree may be composed of an inner node (including a top node) and a leaf node, and the leaf node may correspond to a space containing an object that intersects with the corresponding node. That is, the KD-tree as a spatial partitioning tree may correspond to a kind of spatial partitioning structure.

On the other hand, the inner node may have a bounding box-based space region, and the space region may be divided into two regions and allocated to two lower nodes again. As a result, the inner node may consist of a split plane and sub-trees of two regions split through the split plane, and the leaf node may contain only a series of triangles. For example, the leaf node may include a triangle list for pointing at least one triangle information included in the geometric data, and the triangle information may include vertex coordinates, normal vectors, and/or texture coordinates for three points of the triangle. If the triangle information included in the geometric data is implemented as an array, the triangle list included in the leaf node may correspond to an array index.

On the other hand, a position p at which the space is divided may correspond to a point where the cost (the number of node visits, the number of counting whether the ray intersects with the triangle, etc.) to find a triangle that hits a random ray is minimal, and a currently most used method to find the corresponding position p may correspond to surface area heuristic (SAH).

Figure 3:
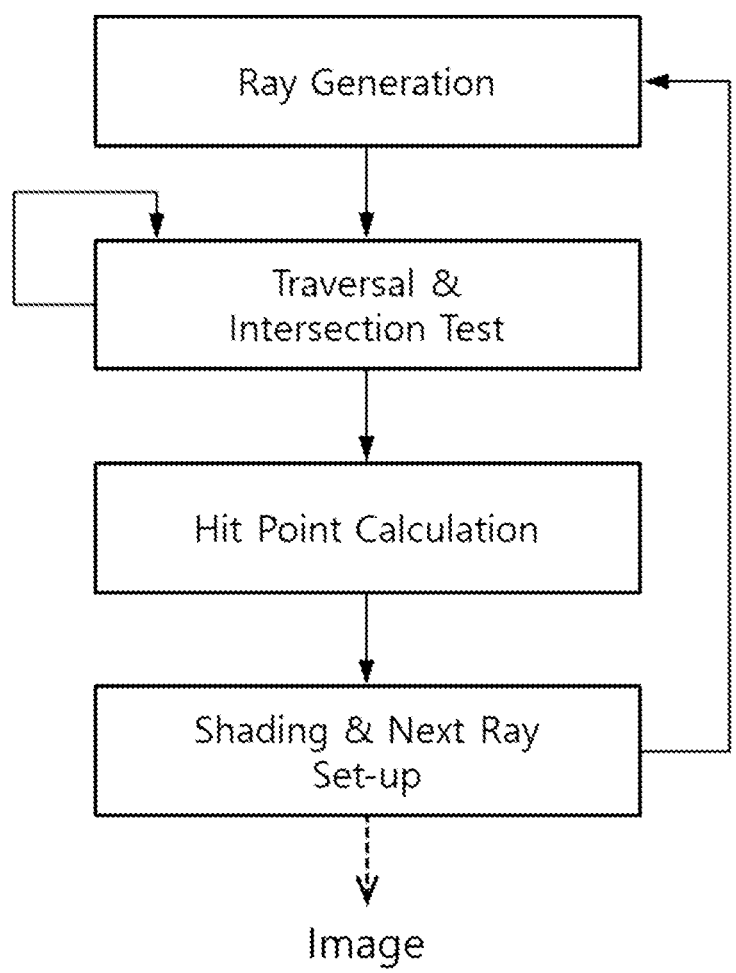
FIG. 3 is a diagram for describing a processing sequence of the ray tracing process.

FIG. 3 is a diagram for describing a processing sequence of the ray tracing process.

Referring to FIG. 3, the ray tracing process may largely include a ray generation step, a traversal & intersection test step, a hit point calculation step, and a shading & next ray set-up step.

First, in the ray generation step, a primary ray may be generated from a viewpoint position for each pixel. In the next step, the acceleration structure (AS) such as the KD-tree and the bounding volume hierarchy (BVH) is searched to find a leaf node that meets a ray. Here, the triangle information is stored in the leaf node.

In the next traversal & intersection test step, it may be tested whether all triangles in the meeting leaf node meet the ray. This process may be recursively performed until the triangle that meets the ray is found. Thereafter, in the hit point calculation step, the hit point may be calculated for the triangle that meets the ray.

In a shading step which is a next step, a color value on a ray-triangle hit point may be calculated. If it is necessary to generate the shadow ray due to illumination or the secondary ray due to a material of the hit triangle, the information is determined in the next ray set-up step and transmitted to the ray generation step. In the ray generation step, the shadow ray and the secondary ray may be generated based on this information.

Figure 4:
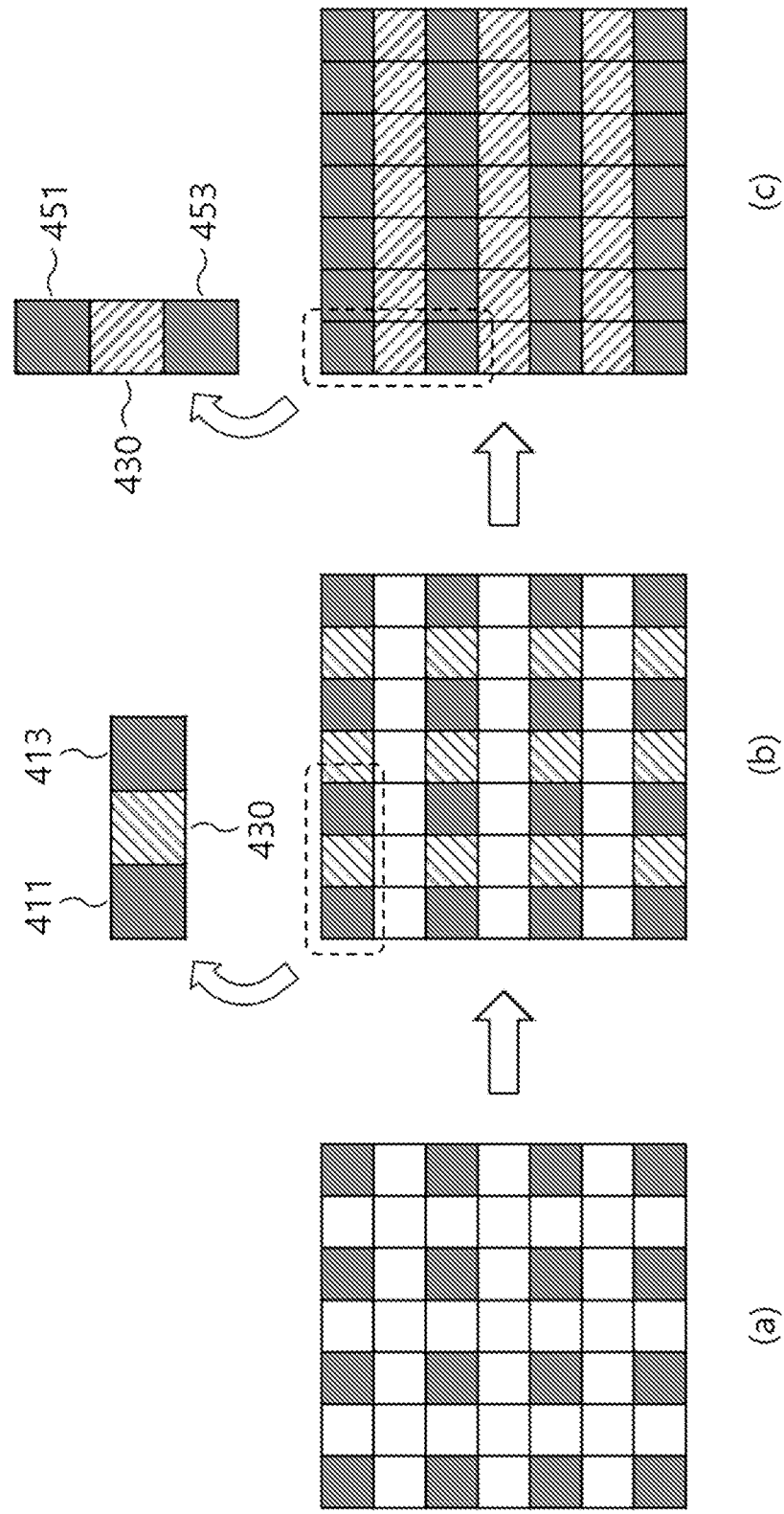
FIG. 4 is a diagram for describing an operation process of selective rendering.

FIG. 4 is a diagram for describing an operation process of selective rendering.

Referring to FIG. 4, in the case of rendering, sampling is generally performed for all pixels, and if the number of samples is smaller than the number of pixels, unsampled pixels may be accordingly generated by interpolating adjacent pixel values.

First, sampling may be performed by skipping x and y coordinates of the pixel one by one. This may be the same as a result of performing rendering at a low resolution. As a result, rendering is performed for the pixel at a gray position in (a) of FIG. 4 to generate the pixel at that position, and an unrendered pixel remains white. In a step of (b) of FIG. 4, after interpolation is performed using pixel data values 411 and 413 of a horizontal position for a pixel 430 that is not rendered, a pixel at the corresponding position may be generated.

After the step of (b) of FIG. 4 is completed, after interpolation is performed using pixel data values 451 and 453 of a vertical position for the pixel 430 that is not rendered, a pixel at the corresponding position may be generated. The embodiment of FIG. 4 may correspond to an example in which sampling is performed by skipping each of the x-coordinate and the y-coordinate one by one, but is not necessarily limited thereto, and may be performed by skipping each coordinate at a larger interval if necessary.

Selective rendering may be performed in a scheme of determining whether to perform interpolation or sampling for an unsampled portion according to a threshold of a color difference. For example, assuming that the threshold is set to 16, interpolation may be performed if the color difference between the sampled neighboring pixels is 16 or less, and sampling may be performed if the color difference exceeds 16. Therefore, if the threshold applied to the selective rendering is increased, rendering performance may increase while the image quality may decrease. By adjusting the threshold in this way, the rendering performance and the image quality may be adaptively selected.

Figure 5:
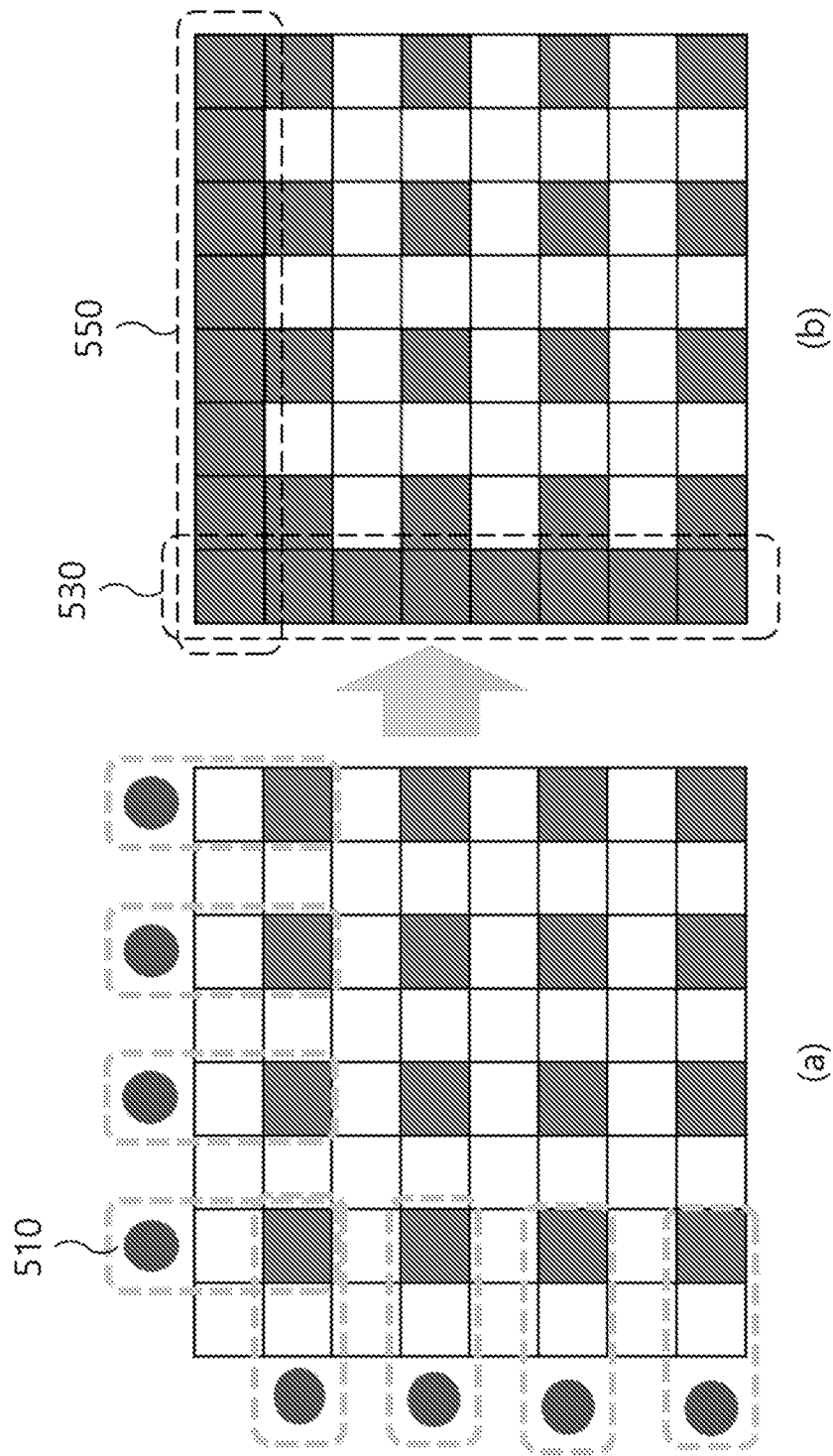
FIG. 5 is a diagram for describing an embodiment of tile-based selective rendering.

FIG. 5 is a diagram for describing an embodiment of tile-based selective rendering.

Referring to FIG. 5, in a traditional tile scheme selective rendering method, selective rendering may be performed by dividing a frame into tile units (FIG. (a)). In the case of FIG. 5, unlike FIG. 4, information required for selective rendering in the boundary region (i.e., boundary (row, column)) is limited, so a separate processing operation may be required. In (a) of FIG. 5, a red circle 510 denotes an adjacent pixel to be referred to when performing the selective rendering, but means a case where there is no information. As a method to overcome this, rendering may be performed for all pixels in boundary regions 530 and 550 in (b) of FIG. 5. This means that performance enhancement is limited because the number of pixels that may be interpolated is significantly reduced when the selective rendering is performed.

As a method to overcome the above-mentioned problem in terms of the performance, a method of bringing a pixel value corresponding to the red circle 510 in (a) of FIG. 5 from a tile adjacent to the current tile may be considered. While this method corresponds to a very effective method, a dependency may be formed between the current tile and the adjacent tile. Due to this dependency, it may be very difficult to apply the method when a plurality of tiles should be processed in parallel.

Figure 6:
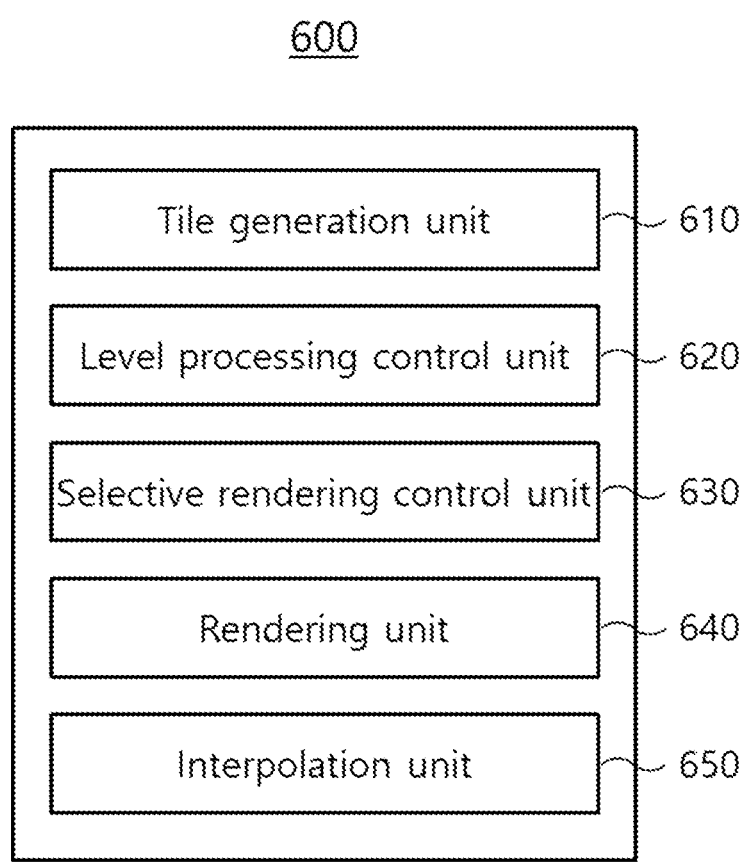
FIG. 6 is a block diagram for describing a physical configuration of a multilevel selective rendering apparatus according to the present disclosure.

FIG. 6 is a block diagram for describing a physical configuration of a multilevel selective rendering apparatus according to the present disclosure.

Referring to FIG. 6, the multilevel selective rendering apparatus 600 may include a tile generation unit 610, a level processing control unit 620, a selective rendering control unit 630, a rendering unit 640, and an interpolation unit 650.

The tile generation unit 610 may generate a plurality of tiles based on an image frame. Here, the image frame may correspond to a frame constituting an image, and the tile may correspond to a pixel or a pixel group within the frame. The tile generation unit 610 may perform an operation of dividing each frame into tiles having a predetermined size. That is, the tile generation unit 610 may process a division operation for the image frame based on a predetermined tile size.

In an embodiment, the tile generation unit 610 may divide each of the image frame horizontally and vertically at equal intervals. Independent numbers of tiles may be generated in each of horizontal and vertical directions according to the division. Further, the tile generation unit 610 may perform the division operation so that all tiles have the same size, and as a result, the tiles may be divided at equal intervals equal to the size of the tile. For example, when one tile is divided to have a size of 32*32 for an image frame having a size of 128*128, a total of 4*4 (=16) tiles may be generated, and four tiles may be generated in each of the vertical direction and the horizontal direction.

The level processing control unit 620 may set a multilevel threshold for the current tile for the image frame divided into the plurality of tiles. Here, the multilevel threshold may include threshold values for each level applied in the multilevel selective rendering process. For example, the multilevel threshold may include a first level threshold corresponding to a high level and a second level threshold corresponding to a low level.

The level processing control unit 620 may set the threshold at the multi-levels in order to increase the efficiency of the selective rendering performed for the divided tiles of the image frame.

In addition, the level processing control unit 620 may perform initial sampling to perform the selective rendering at the multi-levels. To this end, the level processing control unit 620 may operate in conjunction with the rendering unit 640. That is, the level processing control unit 620 may generate a position of a block (pixel) to be sampled in the current tile and transfer the position to the rendering unit 640, and the rendering unit 640 performs the initial sampling based on the position to generate initial sampling blocks. In this case, the initial sampling block may correspond to a pixel block rendered through sampling. Meanwhile, when multi-level selective rendering is performed separately at the high level and the low level, the initial sampling may correspond to high-level sampling.

In an embodiment, the level processing control unit 620 may set a multilevel threshold including a plurality of level thresholds based on a color difference between blocks. In this case, the multilevel threshold may be set so that the high-level threshold is lower than the low-level threshold. For example, the multilevel threshold may include a first level threshold corresponding to the high level and a second level threshold corresponding to the low level. The level processing control unit 620 may set the first and second level thresholds for each divided tile of the image frame to perform the multilevel selective rendering, and update the first and second level thresholds whenever the tile is changed.

In an embodiment, the level processing control unit 620 may decrease each level threshold of the multilevel threshold for each tile as the tile is closer to a central region of the image frame, and increase each level threshold as the tile is closer to an edge region of the image frame. For example, the first and second level thresholds may be respectively decreased for tiles near the central region of the image frame, and the first and second level thresholds may be respectively increased for tiles near the edge region of the image frame.

In other words, the level processing control unit 620 dynamically adjusts the multilevel threshold, thereby maintaining the overall image quality of the image frame at a certain level and providing performance increase according to the selective rendering. In particular, the level processing control unit 620 may automatically decrease the threshold in consideration of the fact that the center of the screen is more sensitive to the image quality, and may automatically increase the threshold toward the edge of the screen. In addition, the level processing control unit 620 may adjust the thresholds at each level of the multi-levels in the case of the multilevel selective rendering.

In an embodiment, the level processing control unit 620 may generate a block position for initial sampling of the current tile and transfer the block position to the rendering unit 640, and receive a result value according to rendering from the rendering unit 640 and store the result value in a tile buffer.

In an embodiment, the level processing control unit 620 may first perform sampling for corner blocks disposed at each corner of the current tile in an initial sampling process. The initial sampling may be performed in a previous stage of the multilevel selective rendering for each tile of the image frame, and in order to solve the rendering problem of blocks in the boundary region of the tile, that is, the boundary (row, column), corner blocks in all corners of the current tile may be particularly sampled.

In an embodiment, the level processing control unit 620 may perform the initial sampling process while moving at equal intervals in the vertical and horizontal directions based on any one of the corner blocks. For example, the level processing control unit 620 may perform sampling every 3 pixels in the vertical direction based on the corner block at the lower right corner among the corner blocks (in this case, the block size is 1 pixel), and then perform sampling every 3 pixels in the horizontal direction. At this time, a priority for the vertical direction or the horizontal direction may be selectively applied.

In an embodiment, when the initial sampling process is completed, the level processing control unit 620 may logically divide the current tile into a normal region including blocks sampled at equal intervals among the initial sampling blocks and a border region including other blocks (i.e., not sampled at the equal intervals). During the initial sampling process, intervals between blocks may be formed differently at the boundary in a specific direction according to the sampling interval, and in this case, blocks with different intervals may be generated at a final boundary in a sampling progress direction (horizontal or vertical direction). This will be described in more detail with reference to FIG. 9.

In an embodiment, the level processing control unit 620 may initialize the multilevel selective rendering for a next tile of the current tile when the multilevel selective rendering for the current tile is completed through repetition of level-specific selective renderings in conjunction with the selective rendering control unit 630.

The selective rendering control unit 630 may perform the selective rendering for each level of the multi-levels. That is, the selective rendering control unit 630 may determine a rendering type according to the multilevel threshold based on the block position within the tile of the current level and control the operation of the rendering unit 640 or the interpolation unit 650 according to the rendering type. That is, the selective rendering control unit 630 may perform multilevel selective rendering for the remaining blocks other than the initial sampling block generated by the initial sampling.

For example, if the initial sampling blocks are generated every 3 pixel intervals, the first level selective rendering may be performed for an intermediate block between the initial sampling blocks, and the second level selective rendering may be performed for blocks between the initial sampling blocks and the first level blocks according to the first level selective rendering. In this case, the first level threshold may be applied to the first level selective rendering, and the second level threshold may be applied to the second level selective rendering. Further, the first level threshold may be set to be lower than the second level threshold. Here, it is described that the multi-levels are limited to the first and second levels (i.e., the high and low levels), but the description may also be applied even to multi-levels constituted by three or more levels.

More specifically, the selective rendering control unit 630 may determine the rendering type of the current level block for the level-specific selective rendering based on the previous level block. Thereafter, the selective rendering control unit 630 may selectively perform any one of interpolation and sampling according to the rendering type determined for the current level block, and when the current level block is generated, perform an operation of storing the current level block in the tile buffer. Here, descriptions of specific operations of interpolation and sampling are omitted.

In addition, the selective rendering control unit 630 may transport, to the frame buffer, the final result values (e.g., initial sampling block, and first and second level blocks) stored in the tile buffer when multilevel selective rendering for all blocks of the current tile is completed. When the multilevel selective rendering is performed for all pixels in the current tile, the selective rendering control unit 630 may move data in the tile buffer onto the frame buffer for an operation on the next tile.

In an embodiment, the selective rendering control unit 630 may initiate the multilevel selective rendering in parallel with respect to the current tile and at least one other tile selected from a plurality of tiles. That is, the selective rendering control unit 630 may sequentially perform the multilevel selective rendering for each tile or perform the multilevel selective rendering for the plurality of tiles in a rendering process for the image frame divided into the plurality of tiles. In the case of the multilevel selective rendering method according to the present disclosure, since there is no dependency between tiles, a plurality of tiles may be processed simultaneously, and the selective rendering control unit 630 may selectively apply a performing scheme of the multilevel selective rendering as needed.

In an embodiment, the selective rendering control unit 630 may determine the interpolation as the rendering type for the current level block when a color difference between adjacent blocks adjacent on both sides in a diagonal, vertical, or horizontal direction based on the current level block is smaller than a current level threshold, and determine the sampling as the rendering type if not. Accordingly, if the color difference between the adjacent blocks is smaller than the current level threshold, the interpolation operation by the interpolation unit 650 may be performed on the corresponding current level block, otherwise, the sampling operation by the rendering unit 640 may be performed for the current level block.

In an embodiment, if the current level block exists in the border region of the current tile, the selective rendering control unit 630 may correct the color difference by applying a weight according to an interval from the adjacent blocks. In the border region, the intervals between the current level block and the adjacent blocks may be different from each other, and accordingly, a higher weight may be applied to an adjacent block existing at a more adjacent position. This will be described in more detail with reference to FIG. 11.

The rendering unit 640 may perform rendering for the blocks of the current tile according to the rendering type to generate the rendering blocks and store the rendering blocks in the tile buffer. That is, the rendering unit 640 may operate in conjunction with the selective rendering control unit 630 in the selective rendering process, and render a specific block according to the rendering type determined by the selective rendering control unit 630 to thereby generate the rendering block. In this case, the rendering block may correspond to a pixel block having a color value generated through rendering as a pixel of a rendering position, and may be generated including pixel position coordinates and color information. The rendering block generated by the rendering unit 640 may be stored in the tile buffer in units of tiles.

The interpolation unit 650 may perform interpolation for the blocks of the current tile according to the rendering type to generate the interpolation blocks and store the interpolation blocks in the tile buffer. That is, the interpolation unit 650 may operate in conjunction with the selective rendering control unit 630 in the selective rendering process, and interpolate a specific block according to the rendering type determined by the selective rendering control unit 630 to thereby generate the interpolation block. In this case, the interpolation block may correspond to a pixel block having a color value generated through interpolation as a pixel of an interpolation position, and may be generated including pixel position coordinates and color information. The interpolation block generated by the interpolation unit 650 may be stored in the tile buffer in units of tiles.

Figure 7:
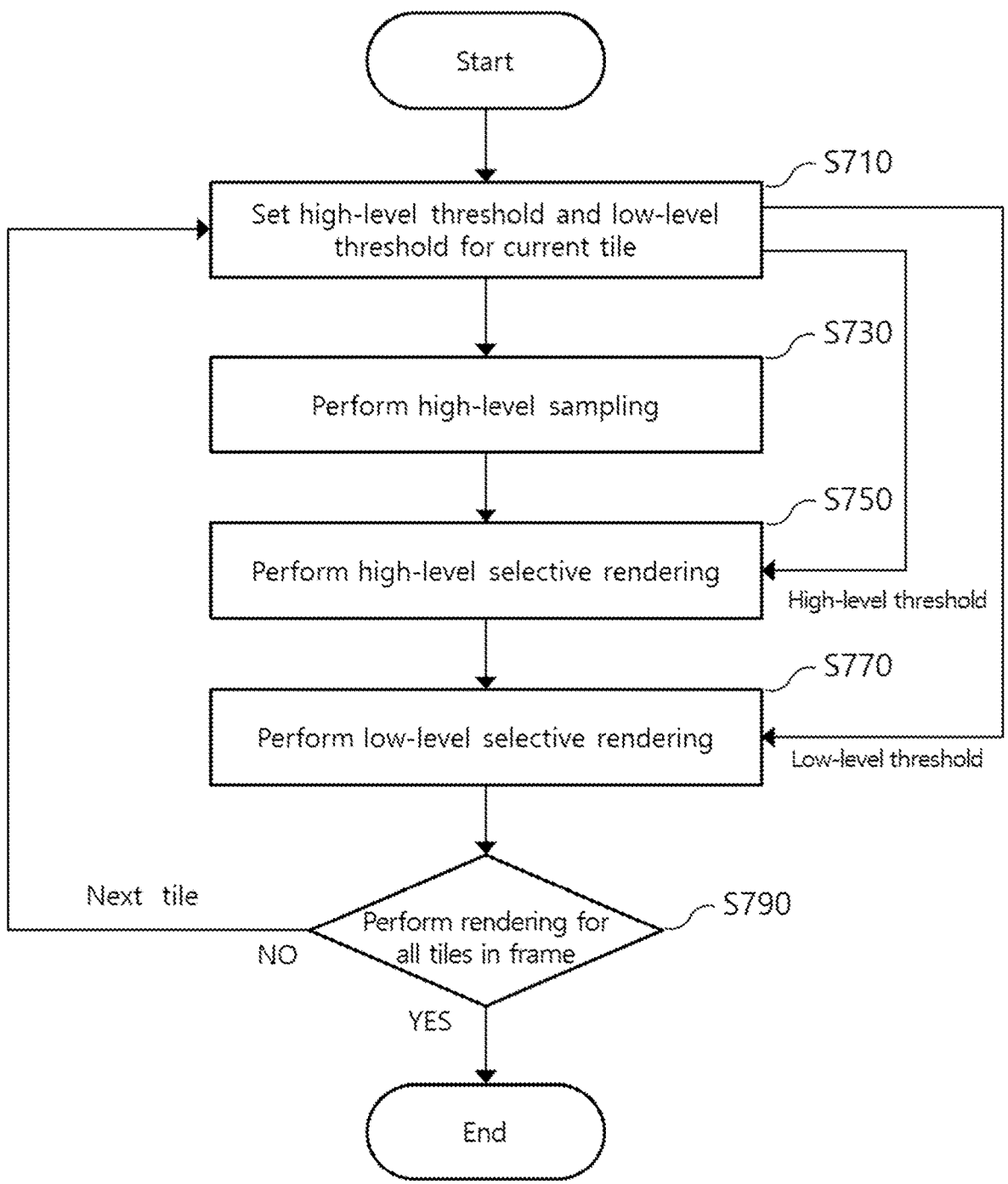
FIG. 7 is a flowchart for describing a multilevel selective rendering method according to the present disclosure.

FIG. 7 is a flowchart for describing a multilevel selective rendering method according to the present disclosure.

Referring to FIG. 7, the multilevel selective rendering method may be recursively performed through predetermined steps in units of tiles of the frame. At this time, it is assumed that one frame is constituted by a plurality of tiles. In a first step S710, each of a first level threshold (or high level threshold) and a second level threshold (or low level threshold) for the current tile may be set. At this time, the set value for the threshold may be automatically generated internally or may be input and set externally.

Figure 8:
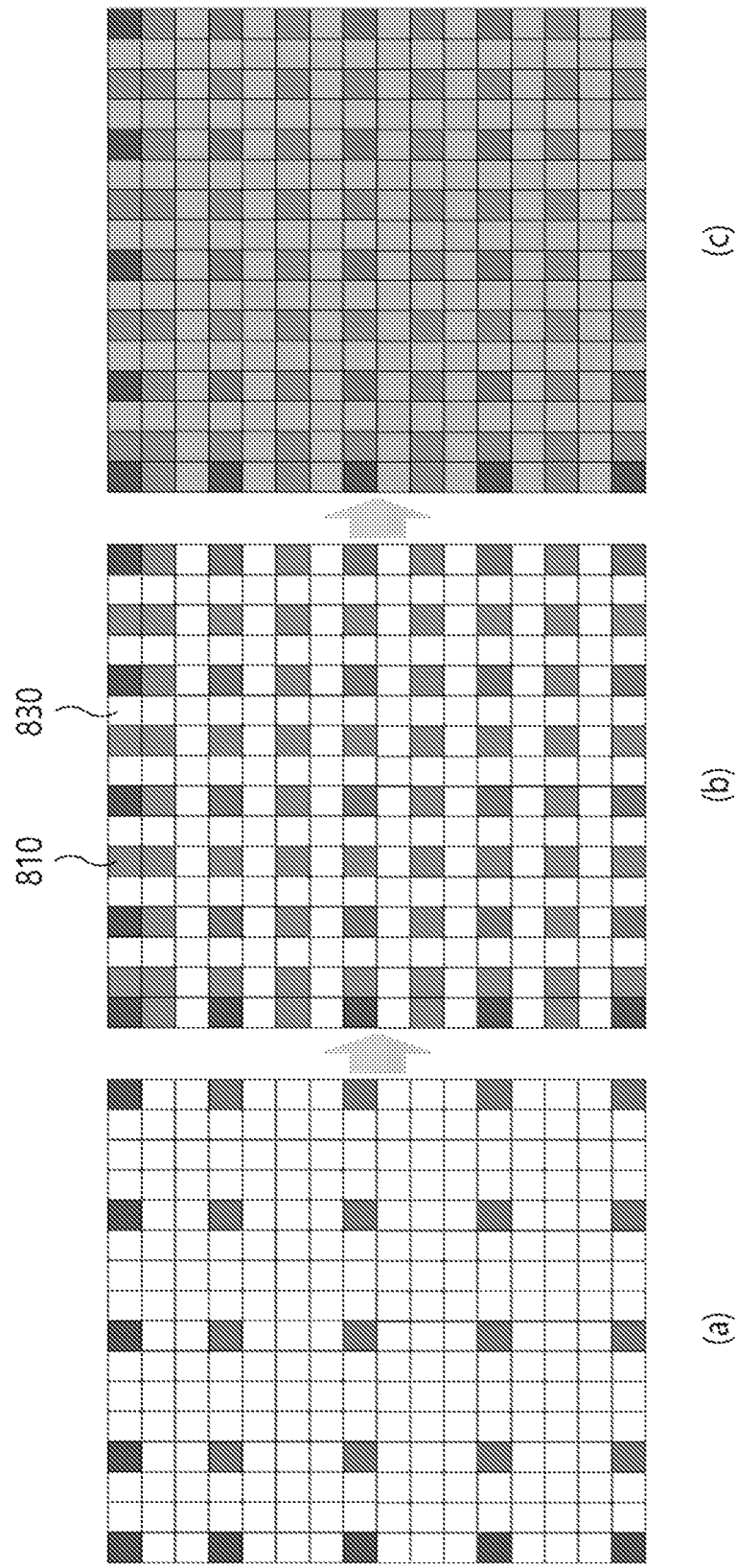
FIG. 8 is a diagram for describing an embodiment of a multilevel selective rendering process according to the present disclosure.

Next, in a second step S730, high-level sampling (i.e., initial sampling) illustrated in (a) of FIG. 8 may be performed. Then, in a third step S750, the high level threshold (i.e., the first level threshold) may be received and high level selective rendering (i.e., the first level selective rendering) illustrated in (b) of FIG. 8 may be performed. Then, in a fourth step S770, the low level threshold (i.e., the second level threshold) may be received based on a result vale in step S750 and low level selective rendering (i.e., the second level selective rendering) illustrated in (c) of FIG. 8 may be performed. This process may be recursively performed for each tile for all tiles in the frame, and if rendering for all tiles is completed, the rendering operation for the corresponding frame may be terminated and the rendering operation for the next frame may be initiated (S790).

The multilevel selective rendering method according to the present disclosure can increase the efficiency of the existing selective rendering by applying three following schemes. The first scheme may be to perform initial sampling by including the border region within the tile. As a result, it is possible to overcome the problem caused by the absence of information about the boundary region described above. In particular, since there is no dependency between tiles, parallel processing for a plurality of tiles may be possible.

The second scheme may be multilevel processing of selective rendering. Unlike (a) of FIG. 4, at a high-level, sampling may be first performed by skipping the x-coordinate and y-coordinate of the pixel by three. After that, selective rendering may be performed based on values obtained at the high level in order to obtain intermediate pixel values of coordinate positions that are skipped one by one. Based on the result values, selective rendering in a similar scheme to the conventional scheme may be performed at the low level. As a result, although the image quality may be slightly lower than that of the conventional scheme, high performance enhancement may be achieved.

In the third scheme, when selective rendering for the high level and the low level is processed, a different threshold may be set for each level. This is because the influence of the threshold on each level is different. That is, since the interval at which pixels are skipped at the high level is larger than that at the low level, the threshold may have a greater effect on the image quality and the performance. For example, by setting a low threshold at the high level and a high threshold at the low level, an increase in performance may be expected while maintaining a certain level of image quality. At this time, the set value for the threshold may be automatically generated internally or may be input externally. For example, since the center of the screen is more sensitive to the image quality, the threshold may be automatically lowered and the threshold may be automatically increased at the edge.

Hereinafter, the multilevel selective rendering method according to the present disclosure will be described in more detail with reference to FIGS. 8 to 11.

Figure 9:
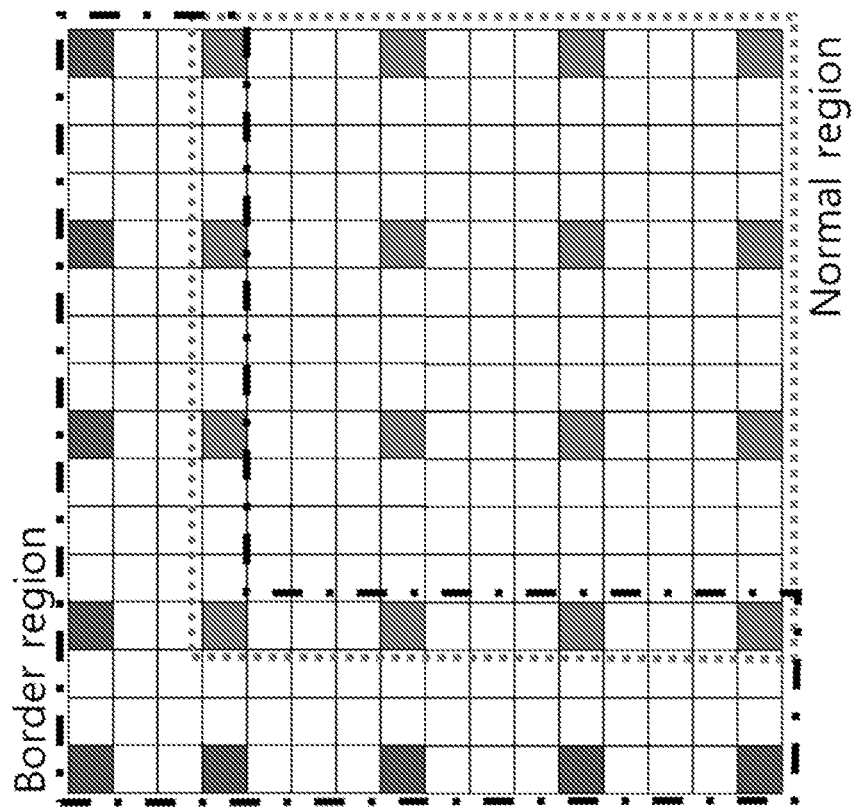
FIG. 9 is a diagram for describing an embodiment of region division according to a first level sampling process.

FIG. 8 illustrates an embodiment of multilevel selective rendering for a tile constituted by pixel blocks. This may be largely constituted by a high level sampling step (or initial sampling step), a high level selective rendering step, and a low level selective rendering step. As a first step, (a) of FIG. 8 illustrates an example of initial sampling for the high level including the boundary region within the tile. Sampling may be necessarily performed at four corners of a 16*16 pixel block once, unlike the conventional scheme. In addition, when sampling is performed by skipping the x-coordinate and y-coordinate of the pixel by three, there may be a normal region to which this rule is applied and a border region to which the rule is not applied, and an embodiment thereof is illustrated in FIG. 9.

Figure 10:
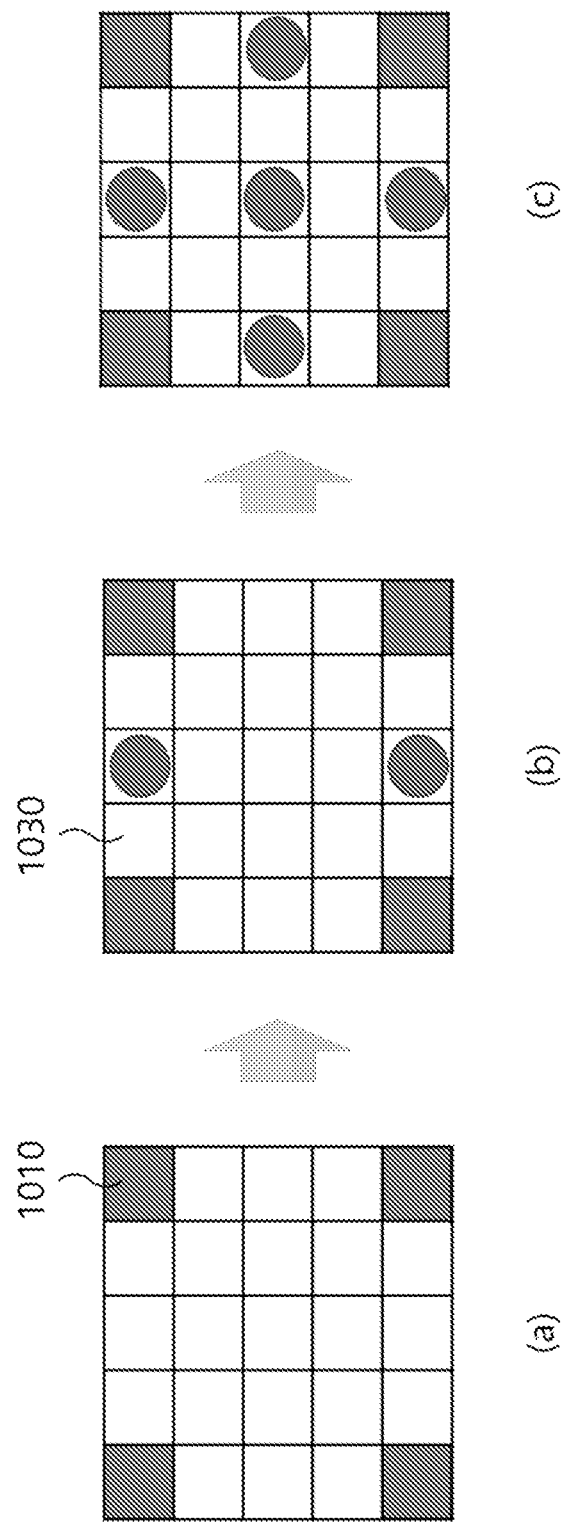
FIG. 10 is a diagram for describing a multilevel selective rendering process for a normal region.
Figure 11:
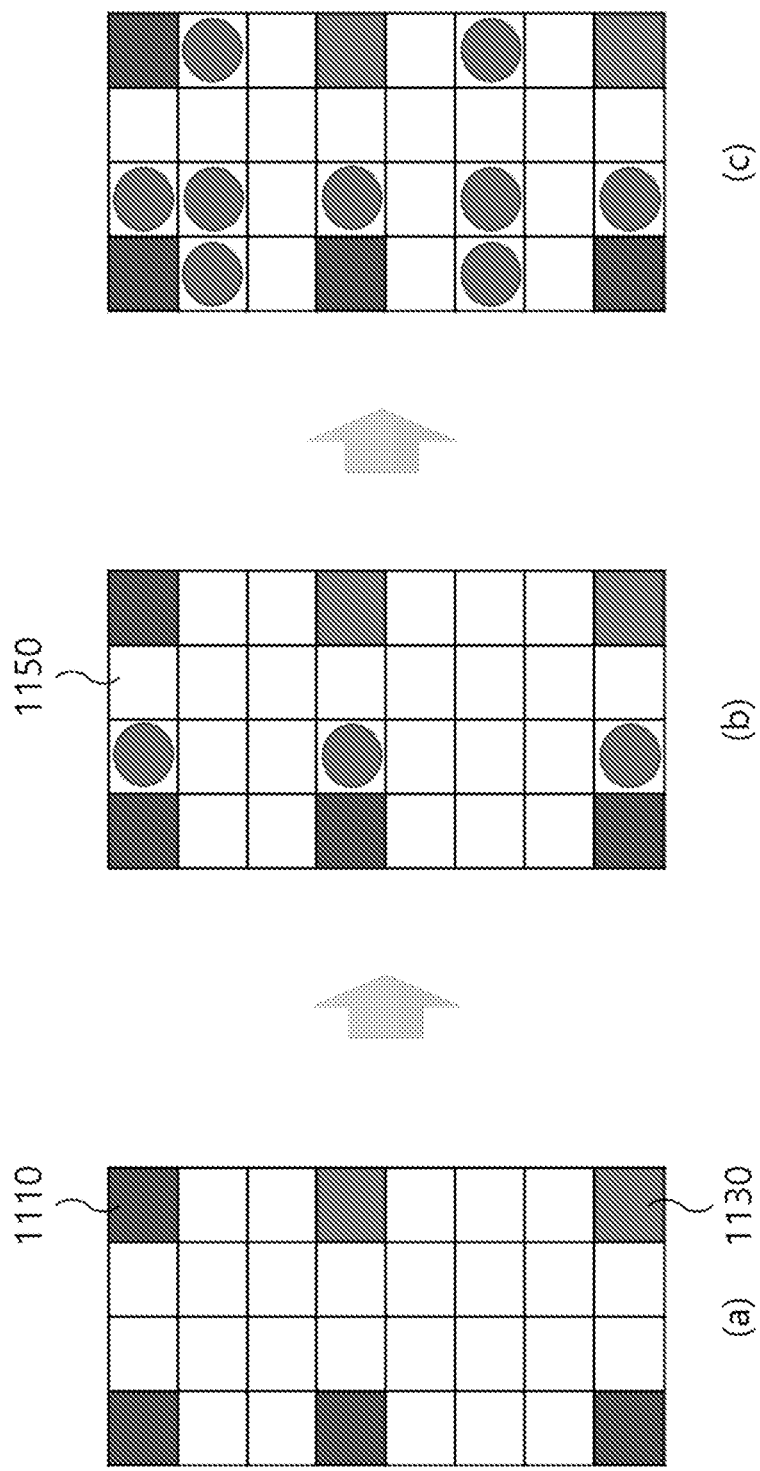
FIG. 11 is a diagram for describing a multilevel selective rendering process for a border region.

As a second step, (b) of FIG. 8 illustrates a selective rendering result for the high level, and may illustrate a result after processes of FIGS. 10 and 11 to be described below. A blue portion 810 in (b) of FIG. 8 may be a selectively rendered pixel. As a third step, (c) of FIG. 8 illustrates a result of performing selective rendering for a white portion 830 in (b) of FIG. 8, and may go through a similar process to FIG. 4. Thresholds used in the second and third steps may be equal to or different from each other, and may be the high level threshold (or the first level threshold) and the low level threshold (or the second level threshold), respectively.

In the normal region illustrated in (a) of FIG. 8, intermediate pixel values of coordinate positions skipped one by one may be obtained through selective rendering. (a) of FIG. 10 may illustrate a result of high level sampling for a normal region constituted by 5*5 pixels. A green color 1010 may be a portion that is sampled and rendered, and a white color 1030 may be a region that is not yet rendered. (b) of FIG. 10 may illustrate a process of obtaining intermediate pixel values of coordinate positions that are skipped one by one by applying high level selective rendering horizontally. That is, the value of the pixel at the corresponding position may be determined by comparing a difference between the color values of the two pixels displayed in the green color 1010 and a predetermined threshold. That is, the interpolation may be performed when the color value difference is less than or equal to the threshold, and the rendering may be performed when the color value difference exceeds the threshold. If this process is also applied vertically, the process may be illustrated as in (c) of FIG. 10.

On the other hand, the border region may have a non-regular portion compared to the normal region. (a) of FIG. 11 may illustrate a result of high level sampling for a border region constituted by 4*8 pixels. A red color 1110 and a green color 1130 may be portions that are sampled and rendered, and a white color 1150 may be a region that is not yet rendered. (b) of FIG. 11 may illustrate a process of obtaining intermediate pixel values of coordinate positions by applying the high level selective rendering horizontally. At this time, if the coordinate position difference between the two sampled pixels is 4, processing may be performed similarly as in (b) of FIG. 10, while if the coordinate position difference is 3, a weight which is as large as the coordinate difference may be applied to the color difference value between two pixels for a comparison. For example, when the value A at coordinate 0 and the value B at coordinate 3 are given, the value C at coordinate 1 may be obtained by giving a 2-fold weight to coordinate 0 and through interpolation between the value at coordinate 0 and the value at coordinate 3. That is, C=(2*A+B)/3. If this process is also applied vertically, the process may be illustrated as in (c) of FIG. 11.

Figure 12:
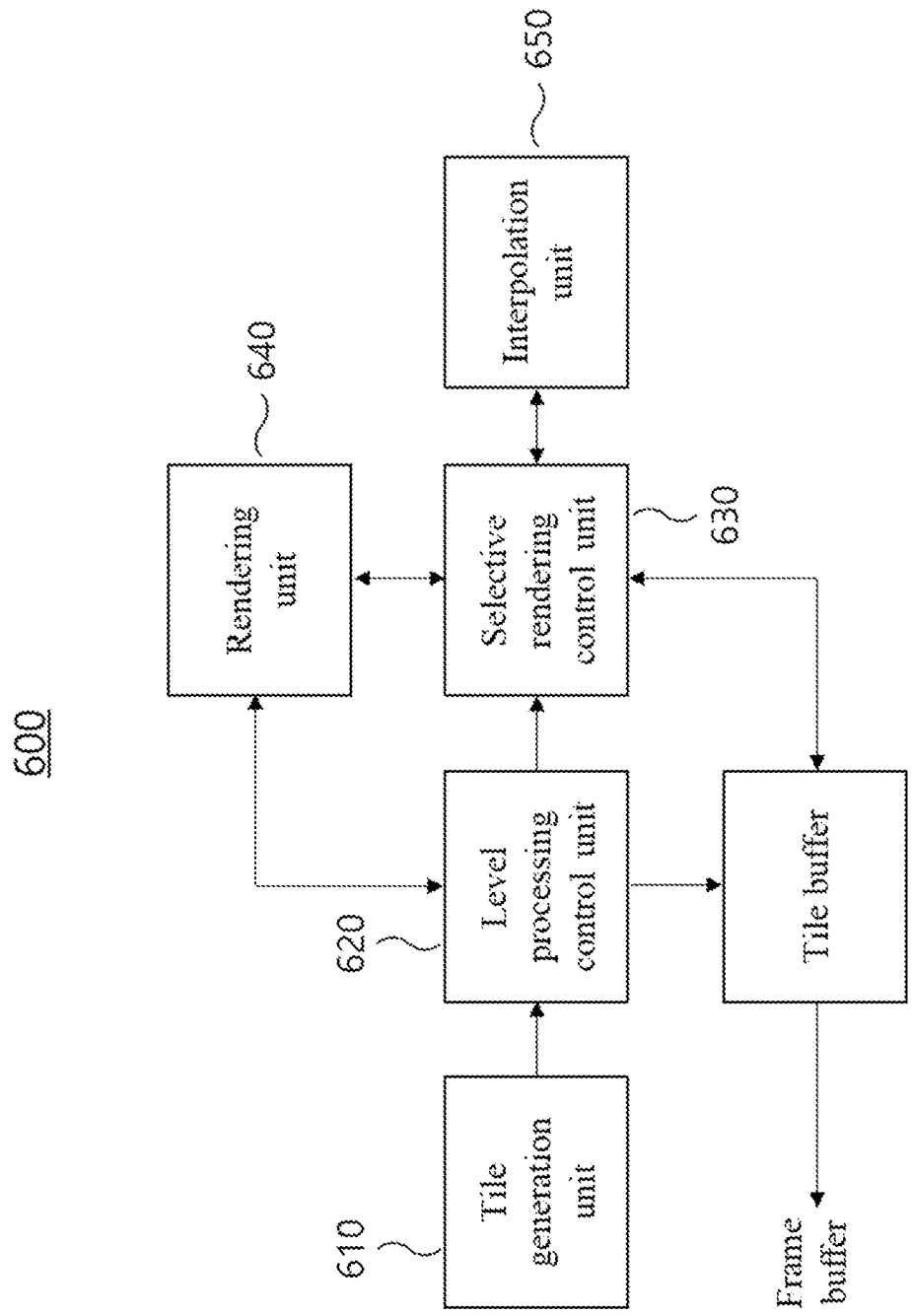
FIG. 12 illustrates a hardware structure of a multilevel selective rendering apparatus according to the present disclosure.

FIG. 12 illustrates a hardware structure of a multilevel selective rendering apparatus 600 according to the present disclosure. This may be largely constituted by a tile generation unit 610, a level processing control unit 620, a selective rendering control unit 630, a rendering unit 640, an interpolation unit 650, and a tile buffer. At this time, the tile generation unit 610, the level processing control unit 620, the selective rendering control unit 630, the rendering unit 640, and the interpolation unit 650 may correspond to the tile generation unit 610, the level processing control unit 620, the selective rendering control unit 630, the rendering unit 640, and the interpolation unit 650 of FIG. 6, respectively.

First, the tile generation unit 610 may divide the entire frame into tiles and manage tile information to be currently processed. The level processing control unit 620 receiving such tile information may perform a comprehensive management operation for the 3-step processing presented in FIG. 8.

The level processing control unit 620 may generate pixel positions to be sampled for the high level sampling presented in (a) of FIG. 8 and send the pixel positions to the rendering unit 640. The rendering unit 640 may perform rendering, and a resulting value may be stored in the tile buffer through the level processing control unit 620. These values may be referenced in the two following steps.

For multilevel selective rendering illustrated in (b) and (c) of FIG. 8, the level processing control unit 620 may set a pixel for selective rendering of the corresponding level and select the pixel to the selective rendering control unit 630. With that information, the selective rendering control unit 630 may calculate a color difference value by referring to the pixel value stored in the tile buffer and compare the color difference value with a threshold. Thresholds used in respective steps may be the same or different.

Depending on the comparison result, the rendering unit 640 or the interpolation unit 650 may be performed, and the result value may be stored in the tile buffer through the selective rendering control unit 630. When all processes are processed, a final result value stored in the tile buffer may be sent to a frame buffer in an external memory.

The present disclosure has been described with reference to the preferred embodiments of the present disclosure, but those skilled in the art will understand that the present disclosure can be variously modified and changed without departing from the spirit and the scope of the present disclosure which are defined in the appended claims.

[Detailed Description of Main Elements]

| | |
|---|---|
| 411, 413: | Pixel data value of horizontal position |
| 430: | Unrendered pixel |
| 451, 453: | Pixel data value of vertical position |
| 600: | Multilevel selective rendering apparatus |
| 610: | Tile generation unit |
| 620: | Level processing control unit |
| 630: | Selective rendering control unit |
| 640: | Rendering unit |
| 650: | Interpolation unit |

The invention claimed is:

1. A multilevel selective rendering method for increasing rendering performance, comprising:
   setting a multilevel threshold for a current tile in a rendering process for an image frame divided into a plurality of tiles;
   generating initial sampling blocks by performing initial sampling for the current tile;
   generating first level blocks by performing first level selective rendering according to a first level threshold of the multilevel threshold based on the initial sampling blocks;
   generating second level blocks by performing second level selective rendering according to a second level threshold of the multilevel threshold based on the first level blocks; and
   initiating the multilevel selective rendering for a next tile of the current tile when multilevel selective rendering for the current tile is completed through repetition of level-specific selective renderings.

2. The multilevel selective rendering method of claim 1, wherein the setting of the multilevel threshold includes setting the multilevel threshold including a plurality of level thresholds based on a color difference between blocks, and the multilevel threshold is set so that a high level threshold is lower than a low level threshold.

3. The multilevel selective rendering method of claim 1, wherein the setting of the multilevel threshold includes decreasing each level threshold of the multilevel threshold for each tile as the tile is closer to a central region of the image frame, and increasing each level threshold as the tile is closer to an edge region of the image frame.

4. The multilevel selective rendering method of claim 1, wherein the generating of the initial sampling blocks includes preferentially performing sampling for corner blocks disposed at each corner of the current tile in the initial sampling process.

5. The multilevel selective rendering method of claim 4, wherein the generating of the initial sampling blocks includes performing the initial sampling process while moving at equal intervals in vertical and horizontal directions based on any one of the corner blocks.

6. The multilevel selective rendering method of claim 5, wherein the generating of the initial sampling blocks includes logically dividing the current tile into a normal region including blocks sampled at equal intervals among the initial sampling blocks and a border region including other blocks when the initial sampling process is completed.

7. The multilevel selective rendering method of claim 1, wherein the generating of the first level or second level blocks includes
   determining a rendering type for a current level block for the level-specific selective rendering based on a previous level block,
   selectively performing any one of interpolation and sampling according to the rendering type for the current level block, and
   storing, when the current level block is generated, the current level block in a tile buffer.

8. The multilevel selective rendering method of claim 7, wherein the generating of the first level or second level blocks includes determining the interpolation as the rendering type for the current level block when a color difference between adjacent blocks adjacent on both sides in a diagonal, vertical, or horizontal direction based on the current level block is smaller than a current level threshold, and determining the sampling as the rendering type if not.

9. The multilevel selective rendering method of claim 8, wherein the generating of the first level or second level blocks includes correcting the color difference by applying a weight according to an interval from the adjacent blocks when the current level block is present in a border region of the current tile.

10. The multilevel selective rendering method of claim 1, wherein the initiating of the multilevel selective rendering includes transporting a final result value stored in the tile buffer to a frame buffer when the multilevel selective rendering for all blocks in the current tile is completed.

11. The multilevel selective rendering method of claim 1, wherein the initiating of the multilevel selective rendering includes initiating the multilevel selective rendering for the current tile and at least one other file selected from the plurality of tiles in parallel.

12. A multilevel selective rendering apparatus for increasing rendering performance, comprising:
   a tile generation unit dividing an image frame into a plurality of tiles in a rendering process for the image frame, and managing information on a current tile among the plurality of tiles;
   a rendering unit performing rendering for blocks of the current tile based on a rendering position;
   an interpolation unit performing interpolation for the blocks of the current tile based on an interpolation position;
   a level processing control unit managing multilevel selective rendering for the current tile; and
   a selective rendering control unit determining a rendering type according to a multilevel threshold based on a block position of a current level, and controlling an operation of the rendering unit or the interpolation unit according to the rendering type.

13. The multilevel selective rendering apparatus of claim 12, wherein the level processing control unit generates a block position for initial sampling of the current tile and transfers the block position to the rendering unit, and receives a result value according to the rendering and stores the result value in a tile buffer.

14. The multilevel selective rendering apparatus of claim 12, wherein the level processing control unit transfers a block position for level-specific selective rendering to the selective rendering control unit.

15. The multilevel selective rendering apparatus of claim 12, wherein the selective rendering control unit calculates a color difference between adjacent blocks based on the block position by referring the tile buffer, and compares the color difference and the multilevel threshold to determine the rendering type.

16. The multilevel selective rendering apparatus of claim 12, wherein the selective rendering control unit receives a result value according to the operation of the rendering unit or the interpolation unit, and stores the result value in the tile buffer.

* * * * *